D. NOBLE.
GEAR SHIFTING MECHANISM.
APPLICATION FILED NOV. 24, 1919.
1,404,049.
Patented Jan. 17, 1922.
2 SHEETS—SHEET 1.
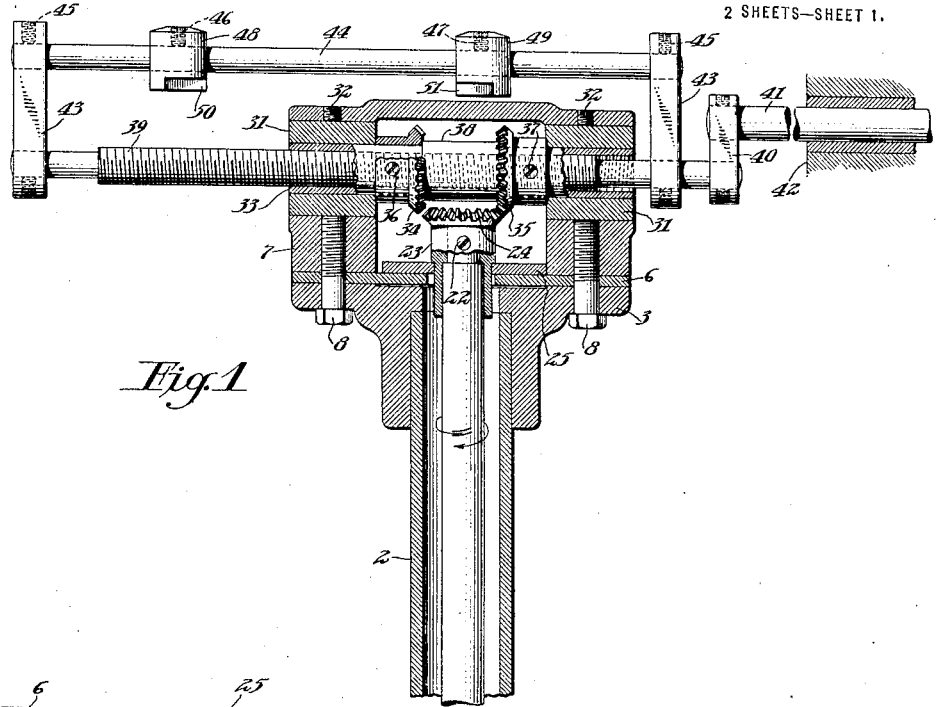
Fig.1
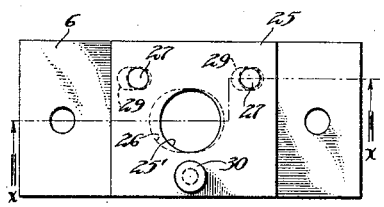
Fig.4
Fig.5
WITNESSES:
Adrian De Man.
C. Homer Pulver
INVENTOR
DONALD NOBLE.
BY
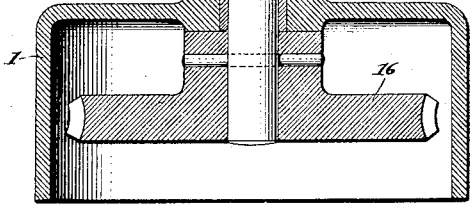
ATTORNEY

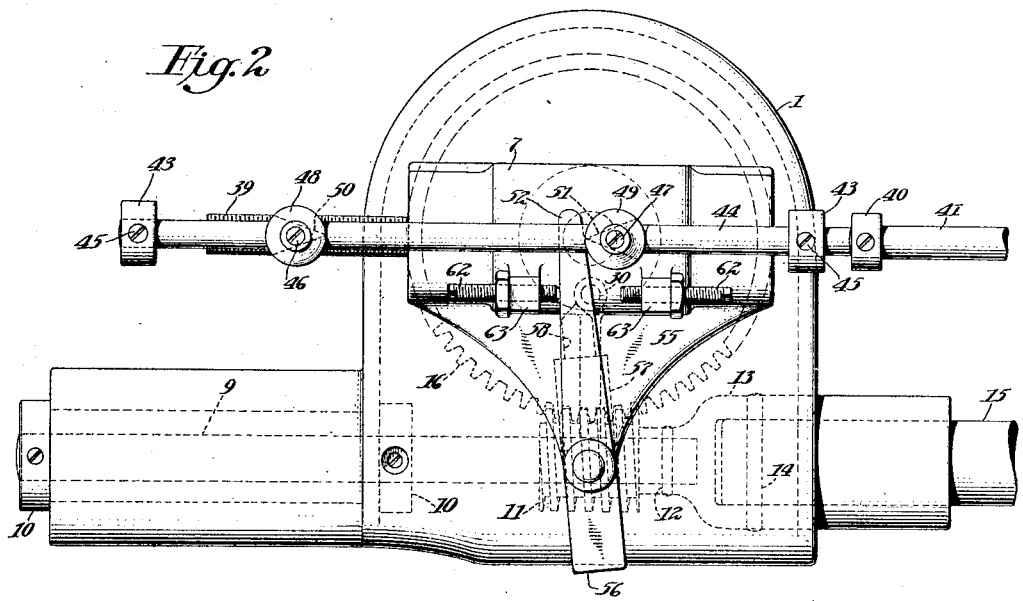

UNITED STATES PATENT OFFICE.

DONALD NOBLE, OF BRIDGEPORT, CONNECTICUT.

GEAR-SHIFTING MECHANISM.

1,404,049.   Specification of Letters Patent.   Patented Jan. 17, 1922.

Application filed November 24, 1919. Serial No. 340,096.

*To all whom it may concern:*

Be it known that I, DONALD NOBLE, a subject of the King of Great Britain, residing at Bridgeport, in the county of Fairfield and State of Connecticut, have invented certain new and useful Improvements in Gear-Shifting Mechanisms, of which the following is a specification.

This invention relates to improvements in gear-shifting mechanisms and has for its primary object to provide a simple, efficient and rapid-shift mechanism of this character.

In many types of machines employing intermeshing gears automatically shifted into and out of operative relation, it is desirable and often essential to relatively shift the gears practically instantaneously. This condition obtains particularly in machines employed for winding some material upon spools, wherein gear shifting mechanism is employed to reverse the direction of movement of the material guiding means. A large majority of the gear shifting mechanisms at present in use are slow in operation and are of cumbersome construction. The present invention obviates these defects inherent in prior constructions.

More specifically, the invention has for an object to provide means for storing energy in one of the gear carrying shafts, which energy is released at the proper time to relatively shift the driving and driven gears.

Another object of this invention is to provide adjustable means for predetermining the shifting time.

A further object of this invention is to positively maintain the gears in complete mesh during the entire period of operative engagement and then practically instantaneously shift the gears relatively.

A still further object of this invention is to provide an improved gear shifting mechanism wherein a driving gear is adapted to operatively engage spaced driven gears alternately to rotate a driven shaft in opposite directions.

The invention has for another object to provide means for imparting oppositely directed, endwise movements to a reciprocating member from a rotating shaft, which member controls the direction of rotation of said shaft.

Other objects of the invention will be apparent from the following description and claims.

To the attainment of the several objects of the present invention, the preferred embodiment thereof comprises a framework in which a driving shaft is rigidly journaled at one end and is free to move laterally at its opposite end. The laterally movable end of the driving shaft carries a driving gear, and a floating journal therefor is afforded by a guide-plate limited to movements in a straight path. The driving gear is adapted to operatively engage spaced driven gears alternately, said spaced gears being suitably carried by a hollow, internally-threaded driven shaft. When the driving gear is in operative engagement with either one of the driven gears, the movable end of the driving shaft is laterally displaced off center, thereby placing the shaft under tension and storing energy therein.

In order to maintain the driving gear in operative engagement with a driven gear against the action of the tensioned driving shaft during a desired period, there is employed a spring-pressed plunger having a tapered free end adapted to engage an element projecting from the guide-plate. Threaded into the hollow driven shaft is a screw-shaft, limited to endwise movements and carrying a trip-bar having a plurality of spaced trip-elements adjustably secured thereto. Projecting into the path of movement of the trip-elements is a shift-lever operatively connected with the spring-pressed plunger so that when the shift-lever is actuated by the trip-elements, the plunger is forced to release the shaft, which in its first endeavor to seek its center passes beyond the same allowing the taper-ended plunger to slip past the projecting element on the guide-plate on the side opposite to its previous engagement thereof, forcing the shaft into engagement with the other driven gear. This action is practically instantaneous and of course results in promptly changing the direction of rotation of the driven shaft, thereby moving the trip-elements in the opposite direction. Adjustable stops are preferably provided to limit the forward movement of the spring-pressed plunger to the desired extent.

In the accompanying drawings, Fig. 1 is a sectional view in front elevation of the preferred embodiment of the present invention. Fig. 2 is a top-plan view of the same. Fig. 3 is a side elevation of the upper portion of the mechanism as viewed from the left in Fig. 1. Fig. 4 is a detail top plan view of the guide-plate affording a floating journal for the driving shaft, together with its supporting plate. Fig. 5 is a sectional view taken on the line x—x, of Fig. 4.

Referring to the drawings, an embodiment of the present invention is illustrated as comprising a framework having a hollow base 1, from which rises the tubular standard 2. Embracing the upper end of the standard 2 is the hub of a support 3 secured upon the standard by means of a set-screw 4 threaded into a boss 5 projecting from the hub. Sustained by the support 3 and spaced therefrom by a supplemental supporting plate 6 is an inverted U-shaped frame 7, which together with the plate 6 is secured upon the support by means of screws, as 8.

Journaled in suitable bearings provided in the base 1 is an actuating shaft, preferably formed in sections to facilitate assembling of the mechanism. One section 9 of the actuating shaft is held against endwise movements by means of collars, as 10, suitably secured thereupon. The section 9 carries a worm 11 and is operatively connected by means of a pin 12 with a coupling 13, secured by pin 14 to another section 15 of the actuating shaft, which section may receive rotary movements from any suitable source. Meshing with the worm 11 is a worm-wheel 16, suitably secured upon the lower section 17 of a rotary driving shaft, which section of the shaft is rigidly journaled against bodily lateral movement in a bushing 18 suitably secured within the standard 2. To further facilitate assembling of the mechanism, the driving shaft is preferably formed in sections, the upper reduced end of the lower section 17 being rigidly connected by means of a coupling-collar 19 and pins, as 20, with a section 21, which numeral will hereinafter be used to designate the driving shaft as a whole, for the sake of clearness. It will be observed that sufficient space is provided in the standard 2 to permit the upper end of the driving shaft 21 to move laterally.

Secured by a set-screw 22 to the upper end of the driving shaft 21 is the hub 23 of a bevelled driving gear 24. The reduced lower end of the hub 23 is journaled in an aperture 25' of a laterally movable guide-plate 25, sustained by the supporting plate 6, which latter plate is provided with an elongated aperture 26 to permit lateral movement of the hub. In order to confine the guide-plate 25 to movements in a straight path, it is provided with pins, as 27, each carrying a guide-roller 28 fitted into elongated apertures, as 29, in the supporting plate 6. It will be observed that the described construction affords a floating fulcrum for the upper end of the driving shaft. Suitably secured upon the guide-plate 25 and projecting above the same is a roller 30, for a purpose hereinafter set forth.

Bushings, as 31, are secured by set-screws as 32 in suitable apertures formed in the frame 7, and afford bearings for a hollow, internally threaded driven shaft 33. The driven shaft 33 is held against endwise movements by the hubs of spaced driven gears 34 and 35 engaging the frame 7, said driven gears being secured upon the driven shaft by set-screws 36 and 37. To insure that the driven gears are held in the desired spaced relation upon the driven shaft 33, a spacing-collar 38 embracing the driven shaft is interposed between the driven gears.

Threaded into the driven shaft 33 is a screw-shaft 39, carrying at one end an arm 40 sustaining a guide-rod 41 slidingly supported by a suitable stationary frame 42. This construction evidently limits the screw-shaft to endwise movements. Adjacent its ends, the screw-shaft 39 carries vertically projecting arms 43 sustaining therebetween a trip-bar 44 secured upon the arms by set-screws, as 45. Adjustably mounted upon the trip-bar 44 and secured by means of set-screws 46 and 47 are trip-elements 48 and 49, formed with wedge-shaped contact-surfaces 50 and 51. Projecting into the path of movement of the trip-elements is one end of a shift-lever 52 of which the opposite end is suitably secured upon a vertical shaft 53 journaled in a bearing provided in a boss 54 formed in a bracket 55 extending forwardly from the frame 7. The shaft 53 carries at its lower end a cylinder 56 formed with a closing wall 57 at its forward end. Slidingly mounted within the cylinder is a plunger 58 tapered at one end and urged in the direction of the driving shaft 21 under the action of a spring 59 interposed between the plunger and the wall 57. The plunger 58 is limited in its endwise movements and is also prevented from turning by means of a pin 60 carried thereby and projecting into slots, as 61 (only one of which is shown) formed in opposite sides of the cylinder 56. The lateral movements of the shift-lever 52 are limited by adjustable screw-studs 62 threaded into lugs, as 63, rising from the frame 7.

The operation of the mechanism described is extremely simple. The upper end of the driving shaft 21 is first forced laterally off center, sufficiently to permit the taper-ended plunger 58 to act upon the roller 30, carried by the guide-plate 25, and under the action of the spring 59 hold the driving and one of the driven gears firmly in mesh. By inspection of Figs. 1 and 2 of the accompanying drawings, it will be seen that the driving-gear 24 is shown as held in mesh with the driven gear 35, by the action of the plunger 58 upon the left-hand side of the roller 30 of the guide-plate 25. In order to limit the extent of forward movement of the plunger 58 under the action of the spring 59, so as to confine the range of contact of the plunger with the roller 30 to the taper-end of the former, the adjustable screw-studs 62 are provided in position to be engaged by the shift-lever 52. The plunger 58 is therefore held against further advancing movement by a screw-stud 62 on one side and the intermeshing gears on the opposite side. Power now being applied to the driving shaft 21 to rotate the same, in the direction indicated by the arrow in Fig. 1, the driven shaft is rotated to cause the screw-shaft 39, and consequently the trip-bar 44 to move toward the right. In the course of this movement, the wedge-shaped end of the trip-element 48 engages the shift-lever 52, causing the latter to swing laterally to force the plunger 58 in a like direction. The lateral movement of the plunger being resisted by the intermeshing gears, it is forced endwise against the action of the spring 59 until the point of the plunger is central with the roller 30. It will be understood that up to this time the gears remain firmly in mesh. The energy stored in the tensioned driving shaft 21 by its displacement off center is now released from the action of the plunger, and in its first endeavor to seek its center, the shaft passes beyond the same sufficiently to permit the plunger 58 to slip past the center of the roller 30 and force the driving gear 24 into mesh with the driven gear 34. This promptly reverses the direction of rotation of the driven-shaft, causing the screw-shaft 39 to travel in the opposite direction, when the foregoing operation is repeated.

In a commercial embodiment of the present invention, the endwise movements of the rod 41 are utilized in a wire-covering machine to actuate a guide employed to direct the covered wire as it is wound upon a spool or cop but it is apparent that within the scope of this invention the endwise movements of the screw-shaft 39 may be otherwise utilized and that power may be otherwise transmitted from the driven gear to another element or elements. It is also to be understood that the invention is not in its entirety limited to a reversing mechanism as it is primarily a gear-shifting device particularly adapted for use in constructions where it is essential to obtain an extremely rapid gear-shift, positively controlled throughout its operation.

Having thus set forth the nature of the invention, what I claim herein is—

1. The combination with a gear, a carrier therefor, and a second gear adapted to operatively engage said first mentioned gear, of a rotary shaft carrying said second gear adapted to be placed under tension whereby energy is stored therein, and means for utilizing energy stored in the tensioned shaft to relatively shift the gears.

2. The combination with a plurality of spaced driven gears, and a driving gear adapted to operatively engage said driven gears alternately, of a driving gear carrying shaft adapted to be placed under tension whereby energy is stored therein, and means for utilizing energy stored in the tensioned shaft to relatively shift the driving and driven gears.

3. The combination with a driven shaft, a plurality of spaced driven gears carried thereby, and a driving gear adapted to operatively engage said driven gears alternately, of a driving gear carrying shaft adapted to be placed under tension whereby energy is stored therein, means for maintaining the driving shaft under tension for a predetermined period, and means for releasing the tensioned driving shaft to relatively shift the driving and driven gears.

4. The combination with a shaft, a gear carried thereby, and a second gear adapted to operatively engage said first mentioned gear, of a rotary shaft carrying said second gear adapted to be placed under tension whereby energy is stored therein, means for placing the second-gear carrying shaft under tension for a predetermined period, and means for releasing the tensioned shaft to relatively shift the gears.

5. The combination with a driven shaft, a gear carried thereby, and a driving gear adapted to operatively engage the driven gear, of a driving gear carrying shaft, means for journaling the driving shaft permitting one end thereof to be resiliently displaced in a direction transverse to its longitudinal axis to store energy therein, and means for utilizing the stored energy in the resiliently displaced shaft to relatively shift the driving and driven gears.

6. In a gear shifting mechanism, the combination with driving and driven shafts, and gears carried thereby, of an endwise movable trip-bar, means for imparting endwise movements to said trip-bar, and operative connections intermediate said trip-bar and one of said gears for relatively shifting said gears at a greater speed than the rate of movement of the trip-bar, said operative connections being constructed and arranged to positively maintain the gears in driving relationship until shifted at said greater speed.

7. In a mechanism for reversing the direction of rotation of a driven shaft, in combination, a plurality of spaced gears carried by said shaft, a driving shaft, a gear carried by said driving shaft adapted to operatively engage said driven gears alternately, an endwise movable trip-bar, means for imparting endwise movements to said trip-bar, and operative connections intermediate said trip-bar and the driving shaft for relatively shifting the driving and driven gears at a greater speed than the rate of movement of the trip-bar, said operative connections being constructed and arranged to positively maintain the gears in driving relationship until shifted at said greater speed.

8. In a gear-shifting mechanism, the combination with driving and driven shafts, and gears carried thereby, of an endwise movable trip-bar, means for imparting endwise movements to said trip-bar, means permitting one end of said driving shaft to be resiliently displaced in a direction transverse to its longitudinal axis to store energy therein, and operative connections intermediate said trip-bar and the resiliently displaced driving shaft for releasing the latter and thereby relatively shifting said gears.

9. In a gear-shifting mechanism, the combination with a rotary driving shaft, and a gear carried by said driving shaft, of a hollow-internally threaded driven shaft, a plurality of spaced gears carried by said driven shaft adapted to be alternately engaged by said driving gear, a screw-shaft disposed within and held against rotation with the driven shaft whereby endwise movements are imparted to said screw-shaft, and operative connections intermediate said screw-shaft and said driving shaft whereby the endwise movements of the screw-shaft causes relative shifting of the driving and driven gears, said operative connections acting to cause a firmer engagement between the driving and a driven gear immediately preceding the relative shifting thereof.

10. In a gear-shifting mechanism, the combination with a rotary driven shaft, a gear carried thereby, and a driving gear adapted to operatively engage said driven gear, of a driving gear carrying shaft, a journal for the driving shaft permitting one end of the latter to be resiliently displaced in a direction transverse to its longitudinal axis to store energy therein, a plunger adapted to hold the shaft in displaced position, means for yieldingly supporting the plunger, and means for releasing the plunger to permit the energy stored in said shaft to relatively shift the gears.

11. In a gear-shifting mechanism, the combination with a rotary driven shaft, a gear carried thereby, and a driving gear adapted to operatively engage said driven gear, of a driving gear carrying shaft, a journal for said driving shaft permitting one end of the latter to be resiliently displaced in a direction transverse to its longitudinal axis to store energy therein, a plunger adapted to hold the shaft in displaced position, means for predetermining the holding position of the plunger, means for yieldingly supporting the plunger, and means for releasing the plunger to permit the energy stored in said shaft to relatively shift the gears.

12. In a gear-shifting mechanism, in combination, a supporting framework, a driven shaft journaled therein, a gear carried by the driven-shaft, a resilient driving shaft, a journal for said driving shaft permitting resilient lateral movement of one end of said shaft relative to its other end, a gear carried by said driving shaft adapted to operatively engage the driven gear, means for rotating said driving shaft, and means for automatically displacing the laterally movable end of the resilient shaft to relatively shift the gears.

13. In a gear shifting mechanism, in combination, a supporting framework, a driven shaft journaled therein, a gear carried by the driven shaft, a driving shaft, a gear carried by the driving shaft, a rigid journal for one end of said driving shaft, means for rotating said driving shaft, a laterally movable guide-plate affording a journal for the opposite end of said driving shaft, a plunger having a tapered end, means for yieldingly causing said plunger to hold the movable end of the driving shaft in laterally displaced position, and means brought into operation by the rotation of the driving shaft for releasing the latter to relatively shift the gears.

14. In a gear-shifting mechanism, in combination, a supporting framework, a driven shaft journaled therein, a gear carried by the driven shaft, a driving shaft, a gear carried by the driving shaft, a rigid journal for one end of said driving shaft, means for rotating said driving shaft, a laterally movable guide-plate affording a journal for the opposite end of said driving shaft, a plunger, means for yieldingly causing said plunger to hold the movable end of the driving shaft in laterally displaced position, an endwise movable screw-shaft, means for moving said screw-shaft endwise during the rotation of said driven shaft, and operative connections between the screw-shaft and said driving shaft for releasing the latter from the plunger to relatively shift the gears.

15. In a gear-shifting mechanism, in combination, a supporting framework, a hollow internally threaded driven shaft journaled therein, spaced gears carried by the driven shaft, a driving shaft, means for rotating said driving shaft, a gear carried by the driving shaft adapted to operatively engage the driven gears alternately, a rigid journal for one end of said driving shaft, a laterally movable guide-plate affording a journal for the opposite end of said driving shaft, a plunger, means for yieldingly causing said plunger to hold the movable end of the driving shaft in laterally displaced position, a screw-shaft disposed within and held against rotation with the driven shaft whereby endwise movements are imparted to said screw-shaft, a trip-bar carried by said screw-shaft, adjustable trip-elements mounted upon said trip-bar, a shift-lever projecting into the path of movement of the trip-elements, and means whereby movement of the shift-lever releases the driving shaft from the plunger to relatively shift the driving and driven gears.

16. In a gear-shifting mechanism, in combination, a supporting framework, a hollow internally-threaded driven shaft journaled therein, a plurality of spaced gears carried by the driven shaft, a driving shaft, a gear carried by the driving shaft adapted to operatively engage the driven gears alternately, a rigid journal for one end of said driving shaft, means for rotating said driving shaft, a laterally movable guide-plate affording a journal for the opposite end of said driving shaft, a plunger, means for yieldingly causing said plunger to hold the movable end of the driving shaft in laterally displaced position, a screw-shaft disposed within and held against rotation with the driven shaft whereby endwise movements are imparted to said screw-shaft, and operative connections between the screw-shaft and said driving shaft for releasing the latter from the plunger to shift the driving gear from operative engagement with one driven gear into like engagement with the other driven gear.

17. In a gear-shifting mechanism, the combination with driving and driven gears adapted to be placed into and out of driving relationship, and supporting means for said gears, of an endwise movable plunger adapted to yieldingly maintain said gears in driving relationship, means for forcing said plunger to move in one direction to release said gears, and adjustable means for limiting movement of the plunger in the opposite direction.

18. In a gear-shifting mechanism, the combination with driving and driven shafts, and gears carried thereby, of operative connections for shifting said gears into and out of driving relationship, said operative connections including means to cause a firmer engagement between the driving and driven gears immediately preceding the relative shifting thereof from driving engagement, and including means to then cause a practically instantaneous relative shifting thereof.

In testimony whereof I affix my signature.

DONALD NOBLE.